Sept. 21, 1948.　　　R. C. MARHOLZ　　　2,449,855
LONGITUDINAL ACTUATING APPARATUS
Filed April 28, 1945
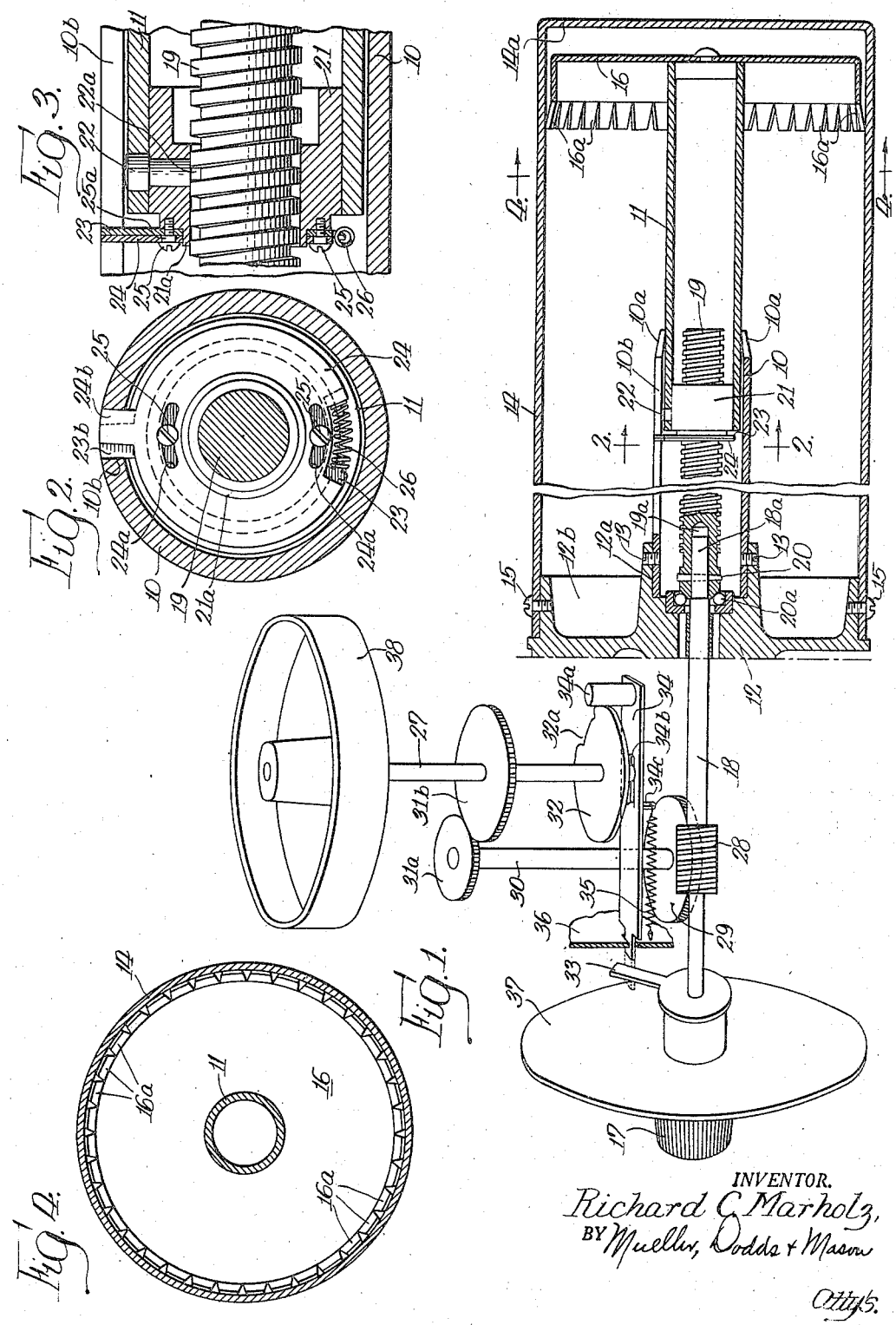
INVENTOR.
Richard C. Marholz,
BY Mueller, Dodds & Mason
Attys.

Patented Sept. 21, 1948

2,449,855

UNITED STATES PATENT OFFICE 2,449,855

LONGITUDINAL ACTUATING APPARATUS

Richard C. Marholz, Chicago, Ill., assignor to Belmont Radio Corporation, Chicago, Ill., a corporation of Illinois Application April 28, 1945, Serial No. 590,891

8 Claims. (Cl. 74—441)

1

This invention relates to longitudinal actuating apparatus and, while it is of general application, it is particularly suitable for adjusting a transmission-line tuner comprising stationary and movable telescoping cylindrical conductors.

Frequently it becomes necessary or desirable to actuate a driven member longitudinally by means of a rotatable actuating means. A common expedient for securing this result comprises a lead-screw rotated by the actuating mechanism and a follower engaging the thread of the lead-screw and having an arm engaging a slotted guide to prevent rotation. In order to avoid excessive friction and binding, the arm usually fits rather loosely in the guide slot and there results a certain amount of back-lash or lost motion in the mechanism; that is a certain amount of rotation of the actuating mechanism takes place in reversing its direction of rotation before the motion of the driven member is reversed. This back-lash is troublesome in many installations, such as in the adjustment of a transmission line tuner comprising stationary and movable telescoping cylindrical conductors.

It is an object of the invention, therefore, to provide a new and improved longitudinal actuating apparatus which overcomes the abovementioned disadvantages of the arrangements of the prior art and specifically substantially eliminates back-lash between the actuating and driven mechanism.

In accordance with the invention, apparatus for longitudinally actuating a driven member comprises a rotatable actuating means, a lead-screw driven by the actuating means, a longitudinal guide adjacent the lead-screw and having parallel opposed faces, and a driven member having a follower engaging the lead-screw. The driven member also comprises a mechanism including a pair of relatively movable arms engaging the guide and means for biasing the arms into engagement with the opposed faces of the guide substantially to eliminate back-lash between the actuating means and the driven member.

In a specific embodiment of the invention, apparatus for adjusting a transmission-line tuner comprising stationary and movable telescoping cylindrical conductors comprises a rotatable actuating means, a lead-screw driven by the actuating means and concentric with the conductors, and a longitudinal cylindrical slotted guide concentric with the lead-screw and adapted to serve as the stationary conductor of the line. The apparatus also includes a driven member for connection to the movable conductor of the line and having a follower engaging the lead-screw, and a mechanism including a pair of relatively movable arms engaging the slot of the guide. The apparatus also includes means for biasing the arms apart and into engagement with the opposed faces of the slot substantially to eliminate backlash.

For a better understanding of the invention, together with other and further objects thereof, reference is had to the following description taken in connection with the accompanying drawings while its scope will be pointed out in the appended claims.

Referring now the drawing, Fig. 1 is a longitudinal sectional view of an actuating apparatus embodying the invention and incorporated in an adjustable transmission-line tuner with an associated indicating and rotation-limiting apparatus shown schematically; Fig. 2 is a cross-sectional detail and Fig. 3 a longitudinal sectional view of the follower device of the apparatus of Fig. 1; while Fig. 4 is a cross-sectional detail of the telescoping transmission-line conductors of the apparatus of Fig. 1.

Referring now to Fig. 1 of the drawing, there is represented apparatus embodying the invention for effecting longitudinal movement of a driven member; for example, apparatus for adjusting a transmission-line tuner comprising stationary and movable telescoping cylindrical conductors 10 and 11, respectively. The cylindrical conductor 10 is secured in a cylindrical recess 12a in an end frame 12 by any suitable means, such as set screws 13. The conductor 10 is provided with a series of resilient contact fingers or brushes 10a which make electrical contact with the telescoping conductor 11. As illustrated, the transmission-line tuner is of the concentric-line type and includes an outer concentric cylindrical conductor 14 secured to a cylindrical hub 12b of the frame member 12 by suitable means such as screws 15. To the remote end of the conductor 11 is secured a cap 16 of a diameter slightly less than the inner diameter of the conductor 14 and provided with resilient contact fingers or brushes 16a engaging the conductor 14. The outer end of the conductor 14 is preferably closed by an integral or assembled plate 14a.

The apparatus also includes rotatable actuating means for driving the cylindrical conductor 11a, for example a manually operable knob 17 secured to a driving shaft 18 which, in turn, is connected to drive a rotatable lead-screw 19 as by means of a key 20 engaging an extension 18a of shaft 18 seated in a recess 19a at the end of the lead-screw 19. The shaft 18 and lead-screw 19 are mounted concentrically with the conductors 10, 11 and 14 and are supported in suitable bearings, one of which is shown in the form of an anti-friction bearing 20a supported in the frame 12.

The apparatus also includes a longitudinal guide adjacent the lead-screw and having opposed parallel faces. For example, the stationary conductor 10 of the transmission line may be provided with a guide slot 10b and serve as the guide for the apparatus. The apparatus also includes a driven member 21 connected or secured to the movable conductor 11 of the transmission line. As shown more clearly in Fig. 2, the member 21 may comprise a cylindrical sleeve rotatably mounted on the lead-screw 19 and secured to the conductor 11 by means of a pin 22 provided with a projection 22a engaging and closely fitting the thread of the lead-screw 19 and constituting a follower therefor.

The driven member 21 of the apparatus also comprises a mechanism including a pair of relatively movable arms engaging the opposed faces of the guide, preferably one of the arms being fixed and one pivoted to the driven member. For example, as shown more clearly in Figs. 2 and 3, the mechanism comprises a pair of concentric notched rings 23 and 24 mounted on a cylindrical hub 21a of the member 21, the ring 23 being fixedly mounted on the member 21 by any suitable means such as a pair of cap screws 25. The other ring 24 is relatively rotatably mounted with respect to the ring 23 as by means of arcuate slots 24a engaging enlarged, unthreaded shanks 25a of the screws 25. The rings 23 and 24 have radially extending arms 23b and 24b, respectively, extending into the guide slot 10b and of a width somewhat less than the width of the slot. The apparatus also includes means for biasing the arms 23b and 24b apart and into engagement with opposed faces of the guide slot 10b. This biasing means may be in the form of a compression spring 26 engaging opposed end walls of registering notches of the rings 23 and 24.

The driving apparatus of the invention may be actuated by any suitable means but there is illustrated schematically, by way of example, an apparatus for limiting the rotation of the shaft 18 to a predetermined number of revolutions, this apparatus, per se, forming the subject matter of applicant's copending application Serial No. 590,892, filed April 28, 1945, entitled "Shaft rotation—limiting apparatus." In brief, this driving apparatus comprises an auxiliary cam shaft 27 and a reduction drive means between the shafts 18 and 27 comprising a worm 28 on the shaft 18 engaging a worm wheel 29 on an intermediate shaft 30 which, in turn, drives the shaft 27 through the spur gearing 31a, 31b. A cam 32 having a depressed portion 32a is mounted on the shaft 27 and there is provided mechanism actuated by the cam 32 for limiting the rotational movement of the driven shaft 18. This mechanism may comprise a member rotatable with the driven shaft 18, for example an arm 33 mounted thereon, and a reciprocating slide 34 movable into engagement with the arm 33 under the control of the cam 32. For example, the slide 34 includes a roller or other cam follower 34a engaging the cam 32 and is provided with a slot 34b engaging and guided by an extension of the cam shaft 27. A tension spring 35 engaging a lug 34c struck out from the slide 34 and a portion of the frame member 36 is effective to bias the roller 34 into engagement with the cam 32. The frame 36 also constitutes additional guide means for the slide 34 to confine it to rectilinear motion. If desired, a vernier indicating means or scale plate 37 may be mounted on the driven shaft 18 and a coarse indicating means or scale drum 38 may be mounted on the auxiliary cam shaft 27.

It is believed that the operation of the apparatus of the invention will be apparent from the foregoing description. In brief, adjustment of the knob 17 is effective to rotate the shaft 18 and the lead-screw 19 which acts on the follower 22a of the driven member 21 to effect longitudinal movement of the member 21 and its associated cylindrical conductor 11 and end cap 16.

In order to prevent excessive friction and minimize binding in the guide slot 10b, the arms 23b and 24b are of a width considerably less than the width of the slot 10b, while the spring 26 is effective to produce relative rotation of the notched rings 23 and 24 so that the arms 23b and 24b are biased into engagement with opposed faces of the slot 10b. This arrangement ensures that the stationary arm 23b is always in a fixed angular position relative to the cylindrical conductor 10b and substantially eliminates back-lash between the actuating knob 17 and the shaft 18 and the driven member 21 and its associated conductor 11. This elimination of back-lash is particularly effective upon reversal of the direction of adjustment of the knob 17, which would otherwise cause a portion of the driven member 21 to engage first one side and then the other side of the slot 10b. By virtue of the contact between the resilient fingers 10a of the cylindrical conductor 10 and the cylindrical conductor 11 and of the electrical contact between the resilient fingers 16a of the cap 16 and the outer cylindrical conductor 14, there is provided a concentric transmission line, the effective electrical length of which, and thus its tuning, may be adjusted by longitudinal adjustment of the conductor 11 and its associated cap 16. In the particular example illustrated, the concentric line is short-circuited at its remote end but it will be readily understood that it may be modified by conventional methods to provide an open-circuit transmission line of adjustable length.

The rotation limiting apparatus described is effective to limit the number of revolutions of the shaft 18 to a predetermined number corresponding to the range of longitudinal adjustment of the cylindrical conductor 11. The number of revolutions of the shaft 18 is somewhat less than the product of the gear ratios between the worm 28 and the worm wheel 29 and that between the gears 31a, 31b. Thus, assuming that the elements are in the relative positions shown in Fig. 1, it is seen that further adjustment of the knob 17 in a counterclockwise direction, which would tend to drive the cap 16 beyond the limits of its normal travel, is effective to allow the cam roller 34a to fall into the depressed portion 32a of the cam 32 and to permit the slide 34 to move under the influence of the spring 35 so that the portion thereof projecting through the frame 36 extends into the path of movement of the arm 33, as illustrated in the dotted-line position, preventing further rotation of the knob 17 and the shaft 18. Conversely, upon rotation of the knob 17 and shaft 18 in a clockwise direction, the cam 32 and cam roller 34a maintain the slide 34 out of engagement with the arm 33 for a number of revolutions of the shaft 18 equal to the product of the gear ratio of the worm 28 and worm wheel 29 and that of the gears 31a, 31b multiplied by the fraction which the raised portion of the cam 32 is of a complete circle. The gear ratios are obviously so selected that the cam roller 34a again falls into the slot 32a after a number of revolutions of the shaft 18 corresponding to the adjustment of the cylindrical conductor 11 to its extreme telescoped position within the conductor 10. After such adjustment, the cam roller 34a again falls into the depression 32a of the cam 32 so that the slide 34 engages the arm 33 and prevents further clockwise rotation of the knob 17 and the shaft 18.

While there has been described what is at present considered to be the preferred embodiment of the invention, it will be apparent to those skilled in the art that various changes and modifications may be made therein without departing from the spirit or scope of the invention.

What is claimed as new is:

1. Apparatus for longitudinally actuating a driven member comprising, a rotatable actuating means, a lead-screw driven by said actuating means, a longitudinal guide adjacent said lead-screw having parallel opposed faces, a driven member having a follower engaging said lead-screw and a mechanism including a pair of relatively movable arms engaging said guide, and means for biasing said arms into engagement with the opposed faces of said guide substantially to eliminate back-lash between said actuating means and said driven member.

2. Apparatus for longitudinally actuating a driven member comprising, a rotatable actuating means, a lead-screw driven by said actuating means, a longitudinal slotted guide adjacent said lead-screw, a driven member having a follower engaging said lead-screw and a mechanism including a pair of relatively movable arms engaging the slot of said guide, and means for biasing said arms apart and into engagement with the opposed faces of said slot substantially to eliminate back-lash between said actuating means and said driven member.

3. Apparatus for longitudinally actuating a driven member comprising, a rotatable actuating means, a lead-screw driven by said actuating means, a longitudinal guide adjacent said lead-screw having parallel opposed faces defining a slot, a driven member having a follower engaging said lead screw and a mechanism including a fixed arm and a pivoted arm engaging said guide, and means for biasing said arms into engagement with the opposed faces of said slot substantially to eliminate back-lash between said actuating means and said driven member.

4. Apparatus for longitudinally actuating a driven member comprising, a rotatable actuating means, a lead-screw driven by said actuating means, a longitudinal guide adjacent said lead-screw having parallel opposed faces defining a slot, a driven member having a follower engaging said lead screw and a mechanism including a pair of concentric relatively rotatable notched rings each having an arm engaging said guide, and a compression spring engaging opposed end walls of the notches of said rings for biasing said arms into engagement with the opposed faces of said slot substantially to eliminate back-lash between said actuating means and said driven member.

5. Apparatus for longitudinally actuating a driven member comprising, a rotatable actuating means, a lead-screw driven by said actuating means, a longitudinal guide adjacent said lead-screw having parallel opposed faces so as to define a slot, a driven member including a sleeve rotatably mounted on said lead-screw and having means engaging the thread thereof and a mechanism including a pair of arms engaging said guide, and means for biasing said arms into engagement with the opposed faces of said slot substantially to eliminate back-lash between said actuating means and said driven member.

6. Apparatus for longitudinally actuating a driven member comprising, a rotatable actuating means, a lead-screw driven by said actuating means, a longitudinal guide adjacent said lead-screw having parallel opposed faces defining a slot, a driven member including a sleeve rotatably mounted on said lead-screw and having means engaging the thread thereof and a pair of notched rings relatively rotatably mounted on said sleeve each having an arm engaging said guide, and a compression spring engaging opposed end walls of the notches of said rings for biasing said arms into engagement with the opposed faces of said slot substantially to eliminate back-lash between said actuating means and said driven member.

7. Apparatus for longitudinally actuating a driven member comprising, a rotatable actuating means, a lead-screw driven by said actuating means, a longitudinal guide adjacent said lead-screw having parallel opposed faces defining a slot, a driven member including a sleeve rotatably mounted on said lead-screw and having means engaging the thread thereof and a pair of notched rings, one fixedly mounted and the other pivotally mounted on said sleeve, each of said rings having an arm engaging said guide, and a compression spring engaging opposed end walls of the notches of said rings for biasing said arms into engagement with the opposed faces of said slot substantially to eliminate back-lash between said actuating means and said driven member.

8. Apparatus for adjusting a transmission-line tuner comprising stationary and movable telescoping cylindrical conductors comprising, a rotatable actuating means, a lead-screw driven by said actuating means and concentric with said conductors, a longitudinal cylindrical slotted guide concentric with said lead-screw and adapted to serve as the stationary conductor of said line, a driven member for connection to the movable conductor of said line having a follower engaging said lead screw and having a mechanism including a pair of relatively movable arms engaging the slot of said guide, and means for biasing said arms apart and into engagement with the opposed faces of said slot substantially to eliminate back-lash between said actuating means and said driven member.

RICHARD C. MARHOLZ.

REFERENCES CITED

The following references are of record in the file of this patent:

UNITED STATES PATENTS

| Number | Name | Date |
|---|---|---|
| 1,231,855 | Cox | July 3, 1917 |
| 1,854,608 | Burger | Apr. 19, 1932 |
| 1,947,069 | Thomas | Feb. 13, 1934 |